United States Patent [19]

Sutula et al.

[11] 4,162,352

[45] Jul. 24, 1979

[54] BATTERY WITH BORON-LITHIUM ALLOY ANODE

[75] Inventors: Raymond A. Sutula, Laurel; Frederick E. Wang, Silver Spring, both of Md.

[73] Assignee: The United States of America as represented by the Secretary of the Navy, Washingon, D.C.

[21] Appl. No.: 726,368

[22] Filed: Sep. 24, 1976

[51] Int. Cl.² .......................................... H01M 12/06
[52] U.S. Cl. .................................. 429/29; 75/134 A; 75/134 P; 429/101; 429/112; 429/218
[58] Field of Search .................. 75/134 A, 134 P; 429/27, 29, 112, 218, 101

[56] References Cited

U.S. PATENT DOCUMENTS

| 3,470,027 | 9/1969 | Nielsen | 429/112 |
| 3,554,806 | 1/1971 | Greenberg et al. | 429/112 |
| 3,909,297 | 9/1975 | Zeitner, Jr. | 429/29 |
| 3,957,532 | 5/1976 | Settle et al. | 75/134 A |
| 4,004,946 | 1/1977 | Farrington et al. | 429/27 X |
| 4,011,372 | 3/1977 | Tomczuk et al. | 75/134 A |

Primary Examiner—Edward A. Miller
Attorney, Agent, or Firm—R. S. Sciascia; A. L. Branning; P. J. Hagan

[57] ABSTRACT

A new anode material consisting essentially of from about 50 weight percent to about 90 weight percent of lithium and from about 50 weight percent to about 10 weight percent of boron, and current generating electrochemical cells utilizing said anode material.

6 Claims, 5 Drawing Figures

BATTERY WITH BORON-LITHIUM ALLOY ANODE

BACKGROUND OF THE INVENTION

This invention relates to current generating electrochemical cells, and more particularly to current generating electrochemical cells wherein the anode material comprises an alloy of lithium and boron.

An electrochemical cell, is generally defined as a system consisting of an anode, a cathode, and an electrolyte which is in contact with, and separates the anode and cathode. In one of its simplest modes of operation an electrochemical cell undergoes an oxidation-reduction reaction to produce an electric current, with the electron transfer occurring through an external circuit. More specifically, oxidation takes place at the anode with the anode material losing electrons which are transmitted through the external circuit, while reduction takes place simultaneously at the cathode with the cathode material accummulating electrons from the external circuit.

Alkali metals, because of their low electronegativity, low equivalent weight and high conductivity are desirable for use as the anode material in electrochemical cells. Conversely, elements of high electronegativity and low equivalent weight such as the halogens and chalcogens, are most suitable as the cathode material in electrochemical cells. Electrochemical cells employing alkali metal anodes and halogen or chalcogen cathodes are characterized by high specific energy, as well as high specific power.

One of the most energetic electrochemical systems known is the lithium-chlorine fused salt system in which lithium, lithium chloride and chlorine gas, serve as the anode material, electrolyte and cathode material, respectively. In electrochemical cells using the lithium-chlorine fused salt system the lithium is normally constrained in a fiber or screen matrix of a lithium-wettable metal, such as iron, stainless steel or nickel, which matrix is mounted in a protective stainless steel shell. This arrangement is necessary because lithium metal is molten at the normal operating temperature of the cell. The chlorine gas is typically diffused into the cell through a porous carbon gas diffuser, which serves as a current collector.

The lithium-chlorine fused salt system has been the subject of very extensive investigation, and the electrochemistry of the system is now well known. Lithium-chlorine fused salt cells produce a high discharge voltage, the electrode reactions are simple and extremely rapid with little or no polarization, and the conductivity of the fused salt electrolyte is at least an order of magnitude greater than the conductivity of electrolytes in aqueous systems. A representative lithium-chlorine cell design is described in detail in U.S. Pat. No. 3,909,297 to Zeitner et al.

Most military applications of current generating electrochemical cells, such as in torpedoes, missiles and small underwater vehicles, require that the cell activation time must be very short, i.e., on the order of thirty seconds or less. During the course of research aimed at the development of a lithium-chlorine cell design having a self-contained heat source capable of activating the cell in thirty seconds or less, two problem areas were encountered involving the lithium anode. The first problem occurred when the cell was heated rapidly to its operating temperature. During the rapid heating the molten lithium flowed out of its matrix and formed a conductive bridge between the anode and cathode, thus shorting out the cell internally. The movement of the lithium out of the matrix is believed to be due in part to the large volume expansion of the lithium metal when the cell is heated rapidly from room temperature to about 600° C.

The second problem involving the lithium anode resulted from attempts to design a rapidly activated lithium-chlorine cell having a self-contained means for hypergolic activation. Hypergolic activation involves placing reactive powdered mixtures, around the anode and on top of, or intermixed with, the electrolyte, which mixtures react exothermically with the chlorine gas to generate intense heat. The heat produced by this reaction raises the temperature of the cell and melts the electrolyte. Once the electrolyte is molten, the cell can be discharged.

Examples of reactive powdered mixtures suitable for initiating hypergolic activation in the manner described above are described in the aforementioned U.S. Pat. No. 3,909,297, as well as in U.S. Pat. application Ser. No. 385,926, filed on July 24, 1973 and now U.S. Pat. No. 4,026,725, in the name of R. A. Sutula, which is assigned to the assignee of the present invention. A particularly effective reactive powdered mixture for hypergolic activation is disclosed in a patent application entitled "Reactive Mixtures", Navy Case No. 57,376 Ser. No. 726,370 by R. A. Sutula, filed on even date herewith.

By providing the cell with means for hypergolic activation, cell activation times shorter than thirty to forty-five seconds are theoretically obtainable. In practice, the heat produced by the reaction of the aforementioned powdered mixtures with chlorine gas not only raises the temperature of the cell but also raises the temperature of the protective stainless steel shell containing the anode material to a point at which the stainless steel reacts directly with the chlorine gas. The additional heat produced from the stainless steel-chlorine reaction vaporizes some of the lithium, which in turn reacts directly with the chlorine gas, producing more heat. Eventually, the anode material is consumed by direct reaction with the chlorine gas and the cell fails to function.

The shortcomings of the prior art anode structures are apparent. The anode design is rather complex in that metal matrices and shells are necessary to constrain and protect the lithium metal. Such provisions are not completely effective, however, since, as mentioned above, when electrochemical cells containing such anode structures are subjected to rapid heating the anode does not perform consistently due to the flow of the molten lithium from the anode structure. Furthermore, the anode structures are not truly chemically compatible with the other materials used in the cell, particularly when the cell is subjected to the intense heat produced by hypergolic activation.

Consequently, a need exists for an anode material which can overcome the above described shortcomings of the prior art anodes which are presently being used in lithium-chlorine fused salt electrochemical cells.

SUMMARY OF THE INVENTION

Accordingly, it is an object of the present invention to provide a new anode material for use in current generating electrochemical cells.

Another object of this invention is to provide a replacement for the anode structure of the lithium-chlorine fused salt electrochemical cells of the prior art.

It is a further object of the present invention to provide a new anode material which obviates the use of structural materials to constrain the anode material at high temperatures.

It is also an object of the present invention to provide a new anode material which maintains its configuration at the temperature of operation of heat-activated electrochemical cells, such as the lithium-chlorine fused salt system.

It is another object of this invention to provide an anode material which is chemically compatible with the other cell cmoponents employed in a hypergolically activated electrochemical cell, such as the lithium-chlorine fused salt system.

These objects are accomplished by providing a current generating electrochemical cell comprising an anode, a cathode, and an electrolyte positioned between and in contact with the anode and cathode wherein the anode consists essentially of from about 50 weight percent to about 90 weight percent of lithium and from about 10 weight percent to about 50 weight percent of boron.

The anode material of the present invention can be used successfully as a replacement for the anode structures of the prior art electrochemical cells based on the lithium-chlorine fused salt system. Moreover, the lithium-boron anode material of the present invention can be substituted in any electrochemical cell employing a reactive metal anode, such as sodium, lithium, magnesium, beryllium, aluminum, or calcium, or alloys thereof, and especially where the operating temperature of the cell is above the melting point of lithium metal. Furthermore, while it is preferable to employ some form of protective shield to ensure against accidental deformation of the anode material at high temperature, the anode material of the present invention will operate satisfactorily in the absence of structural materials used to constrain or protect it and maintain its configuration at the temperature of operation of heat-activated electrochemical cells. Another significant feature of the new anode material is that it is chemically compatible with other cell components typically employed in hypergolically activated electrochemical cells.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood that the foregoing abstract of the disclosure is for the purpose of providing a non-legal brief statement to serve as a searching-scanning tool for scientists, engineers and researchers and is not intended to limit the scope of the invention as disclosed herein, nor is it intended that it should be used in interpreting or in any way limiting the scope or fair meaning of the appended claims.

BRIEF DESCRIPTION OF THE DRAWINGS

The invention will be further described in conjunction with the accompanying drawings, in which.

DETAILED DESCRIPTION OF THE PREFERRED EMBODIMENTS

The anode material of the present invention may be prepared according to the process set forth by Dr. F. E. Wang in U.S. patent application Ser. No. 377,671, filed July 3, 1973, which is assigned to the assignee of the present invention. Briefly, an alloy of the formula $Li_xB_{1-x}$ wherein $0.61 \leq x \leq 0.93$ and X is the atomic fraction of lithium, is prepared according to this process by forming a physical mixture of the appropriate quantity of elemental lithium and boron for any pre-determined composition, heating the mixture in a crucible at a temperature of about 250° C. to about 400° C., maintaining the temperature within this range for a time sufficient to effect complete dissolution of the boron in the liquid lithium, raising the temperature of the solution slowly to a range of about 400° C. to about 550° C. to effect total solidification of the liquid solution, and maintaining the temperature between about 530° C. and about 550° C. until an exotherm is observed. The resulting alloy can be machined, or molded into a desired shape. The alloy can also be cast into various forms provided it is done prior to the solidification step.

Crystalline boron is preferred over amorphous boron in the above described process because amorphous boron typically has an oxide coating thereon which impedes the dissolution of the boron in the liquid lithium. As a result, the alloying of the lithium and boron is retarded or prevented completely. However, amorphous boron may be used if the boron oxide content thereof is maintained at less than 0.2 weight percent. Further details of the process are set forth in the aforementioned patent application Ser. No. 377,671, the disclosure of which is incorporated herein by reference.

While an alloy of the formula $Li_xB_{1-x}$ wherein $0.61 \leq x \leq 0.93$, i.e., 50 to 90 weight percent of lithium and 10 to 50 weight percent of boron, is operable as an anode material, the preferred anode material is composed of from about 60 weight percent to about 80 weight percent of lithium and from about 40 weight percent to about 20 weight percent of boron. If the alloy contains greater than 90 weight percent of lithium, it performs like the lithium anodes of the prior art and exhibits the shortcomings thereof, which have been described above. If the alloy contains less than 50 weight percent of lithium, it is believed that the anode cannot be discharged at a current density greater than 2–8 amp/cm$^2$.

The expression "anode material", as used herein, is intended to signify the reactive substance of the anode, i.e., the material which undergoes oxidation. Alloys of the reactive substance are also included within the expression "anode material". By contrast, the expression "anode structure" is intended to signify the reactive substance and any structural material used in combination therewith in order to ensure that the anode functions properly. The same distinction is made herein with regard to the "cathode material" and "cathode structure". Accordingly, chlorine gas is the cathode material and chlorine gas in combination with the porous carbon current collector is the cathode structure.

While the anode material of the present invention is useful in rechargeable electrochemical cells, it is particularly useful in the fabrication of primary electrochemical cells, and especially in heat activated primary cells wherein the cathode material is an elemental halogen, or a chalcogen having a molecular weight between 16 and 52, and the electrolyte is either a solid, e.g. ceramic, capable of transmitting ions of the anode material, but not substantially transmitting electrons, molecules of the anode material or ions or molecular species of the cathodes, or a fusible alkali metal salt or mixtures thereof, or a fusible alkali earth metal salt, or mixtures thereof. Mixtures of alkali metal and alkali earth metal salts may also be used as electrolytes. The expressions "fusible salt electrolyte" or "fused salt electrolyte" are intended to signify those electrolytes which are typically employed in molten salt electrochemical cells. The fused salts are preferred because they offer the lowest resistivities. The preferred fused salt electrolyte for use in conjunction with the lithium-boron anode material is a eutectic mixture of lithium chloride and potassium chloride. Chloride gas is the preferred cathode material. The preferred method of heat activation is by means of the hypergolic mixtures described hereinabove.

Current collectors may be inserted into the lithium-boron anode material according to methods well known to the skilled artisan. For example, a cylindrical ingot of the lithium-boron alloy can be drilled and tapped to receive a threaded stainless steel bolt which serves as the current collector. Alternatively, a threaded molybdenum cylinder, the length of which is approximately six to nine times the diameter, can be drilled through the diameter thereof to provide three evenly spaced holes at one end of the cylinder. Pins composed of a metal which resists chemical attack by the other cell components, e.g., nickel 200, are inserted through the holes, the first and third of which are parallel to one another while the second is perpendicular to the other two, as can be seen in the cutaway portion of the anode material in FIG. 2. The metal pins provide good mechanical support for the anode material and good electrical contact between the anode material and the current collector. The portion of the molybdenum containing the metal pins is coated with molten lithium at 700° C. and cooled to room temperature. The lithium-coated molybdenum cylinder is then inserted into the lithium boron solution prior to the transition temperature at which the lithium-boron solution becomes a solid. If the lithium-boron solution is agitated continuously, the insertion of the molybdenum cylinder therein may be carried out at temperatures as high as 700° C.

The latter method of inserting the current collector into the lithium-boron anode material is preferred because it eliminates the drilling and tapping operations. The preparation of the anode material and insertion of the current collector, as well as the cell assembly described hereinbelow should be performed in a glove box in an inert atmosphere, such as helium, in order to ensure that contact with impurities such as $O_2$, $H_2O$ and $N_2$ is kept to a minimum, each impurity being less than 1 ppm.

The preparation of a current generating electrochemical cell employing the lithium-boron anode material of the present invention is best described with reference to the drawings.

Figure 1:
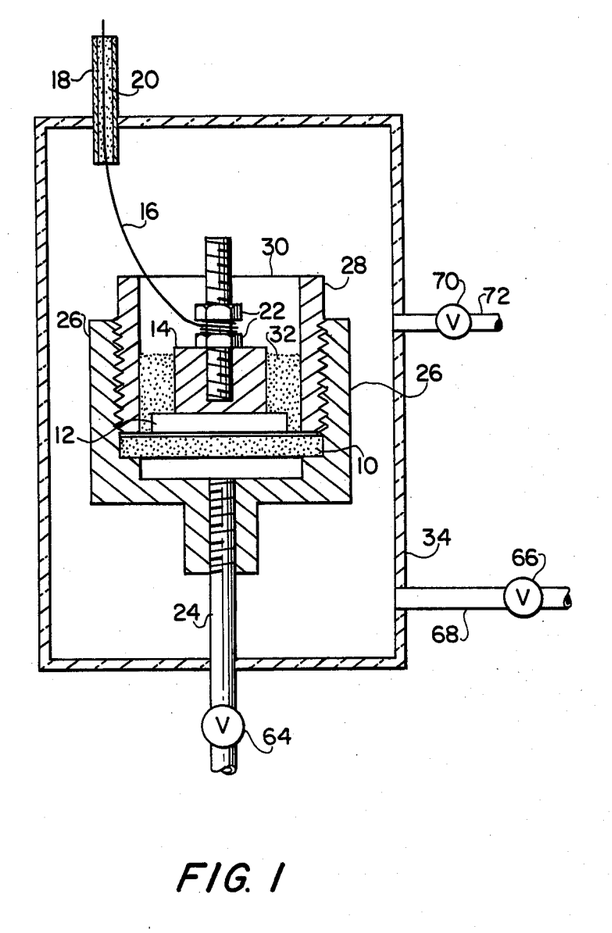
FIG. 1 is a cross-sectional view of one embodiment of an electrochemical cell utilizing the anode material of the present invention.

The electrochemical cell of FIG. 1 contains a porous graphite (POCO AX) gas diffuser 10 at which reduction of the chlorine gas takes place. POCO is a trademark for a series of unique, finegrained, high strength, isotropic, formed graphite materials available from POCO Graphite, Inc., a subsidiary of Union Oil Co., of California. The anode material 14 is a lithium-boron alloy of the formula $Li_{0.78} B_{0.22}$, i.e., 70 weight percent of lithium and 30 weight percent of boron. A pressed electrolyte pellet 12 composed of a eutectic mixture of LiCl-KCl is interposed between the gas diffuser 10 and the anode material 14, and is in contact with the gas diffuser and anode material. A copper wire 16 which serves as the negative electrical connection for the cell is fed through glass tube 18 and sealed with epoxy cement 20. The anode material is secured to the copper wire by nickel 200 nuts 22. Gas conduit 24, made of 316 stainless steel, is screwed into the dense graphite (POCO AXF-5Q) support member 26 and serves as both the positive electrical connection for the cell, as well as the conduit through which chlorine gas is introduced into the cell. A dense graphite (POCO AXF-5Q) cell wall 28 is screwed into the support member 26 and with the gas diffuser 10 forms a chamber 30 which is open at the top. A hypergolic mixture 32 such as those described hereinabove, is inserted in chamber 30 and is in contact with the gas diffuser 10, the electrolyte pellet 12, and the anode material 14. An hermetically sealed glass vessel 34 encloses the cell components.

Figure 2:
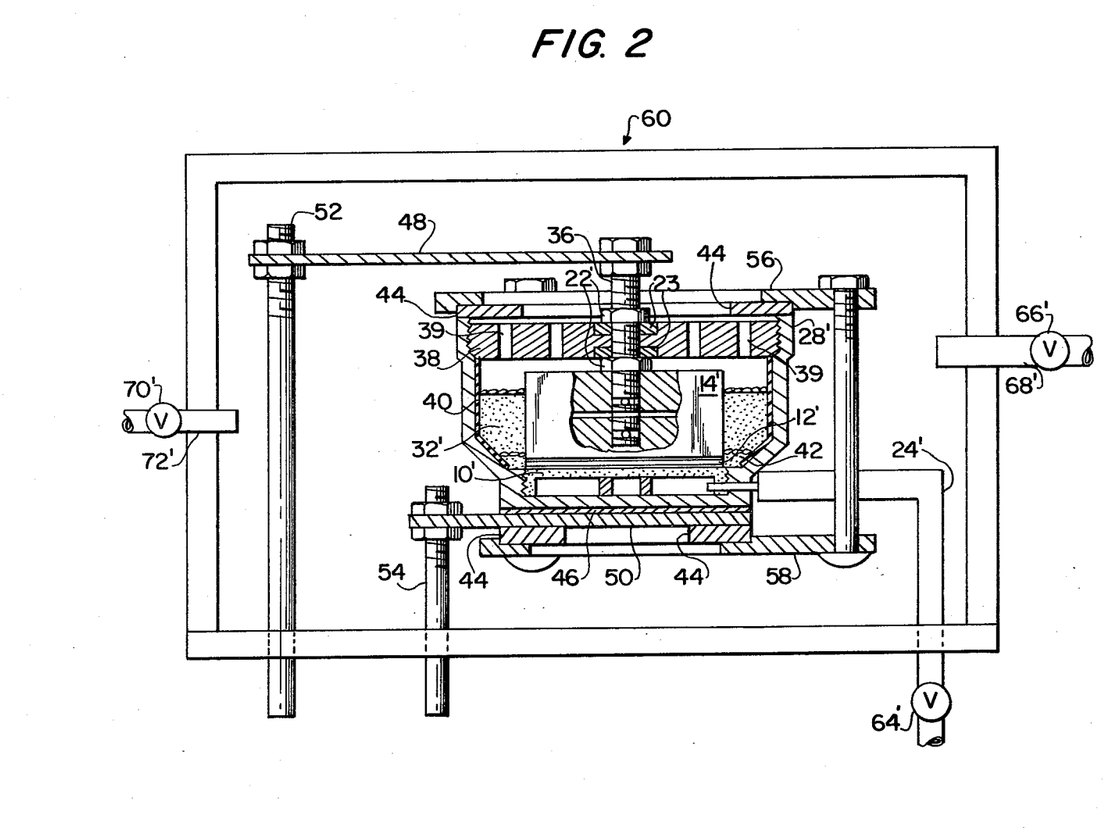
FIG. 2 is a cross-sectional view of another embodiment of an electrochemical cell utilizing the anode material of the present invention.

The electrochemical cell of FIG. 2 closely resembles the type of cell which would be employed in the fabrication of a lithium-chlorine fused salt electrolyte battery. Prime reference characters are used to refer to those structural members which substantially correspond to the members already described with respect to FIG. 1. The cell contains a porous graphite gas diffuser 10' in contact with a pressed electrolyte pellet 12' which is composed of a eutectic mixture of LiCl-KCl and which is in contact with the lithium-boron anode material 14'. The anode material is of the same composition as in FIG. 1. The molybdenum current collector 36 serves as both the negative electrical connection and as a support for the anode material 14'. Nickel 200 nuts, 22', and washers 23 are used to attach the current collector 36 to the boron nitride cell cover 38. The side walls 28' of the cell are made of dense graphtie (POCO AXF-5Q) and lined with a boron nitride sleeve 40. Since the electrolyte pellet does not cover the entire surface of the gas diffuser 10', powdered LiCl-KCl eutectic 42 is inserted between the gas diffuser and the hypergolic mixture 32' to insure that when the LiCl-KCl melts, the volume between the anode and gas diffuser will be filled with molten electrolyte. Other structural members of the cell include boron nitride insulators 44, Feltmetal pad 46, anode connector 48, cathode current connector 50, anode terminal 52, cathode terminal 54, top clamp 56, and bottom clamp 58. The cell is enclosed within a pressure vessel 60.

The operation of the electrochemical cells shown in FIGS. 1 and 2 is analogous. Activation is accomplished by opening valve 64, 64' and introducing chlorine gas into the cell through conduit 24, 24' at a pressure of about 15 psig. At the same time valve 66, 66' is opened allowing chlorine gas to flow into the cell through conduit 68, 68' at a pressure of 10 psig. Chlorine gas entering the cell at conduit 24, 24' passes through the gas diffuser 10, 10', and contacts the hypergolic mixture 32, 32' from below, while the chlorine gas entering at conduit 68, 68' comes into contact with the hypergolic mixture from above, through vent holes 39 in the cell of FIG. 2. The ensuing reaction between the chlorine gas and the hypergolic mixture is highly exothermic and generates sufficient heat to melt the electrolyte and raise the cell to its operating temperature within thirty seconds. The flow of chlorine gas through conduit 68, 68' is terminated after activation is achieved. The flow of chlorine gas through conduit 64,64' into the cell is maintained during the discharge of the cell by flutter valve 70, 70' which is attached to a low pressure exhaust line 72, 72'.

To further describe this invention the following specific examples are given of current producing electrochemical cells employing the lithium-boron anode material. The examples are intended to illustrate the operability of the invention without limiting the scope thereof.

EXAMPLE I

Figure 3:
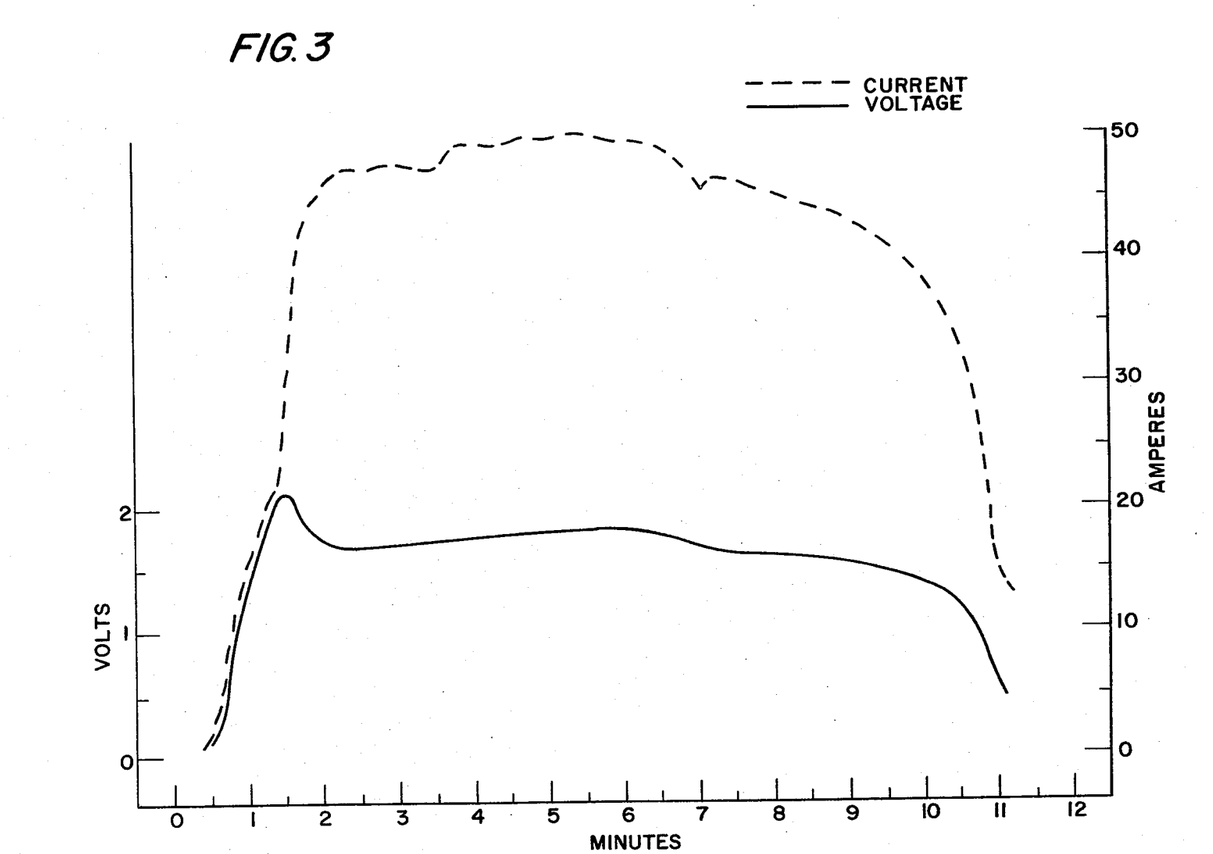
FIG. 3 shows a current and voltage discharge curve for the cell of FIG. 1.

The laboratory cell of FIG. 1 was assembled wherein the pressed electrolyte pellet was 4.0 gm of −80 mesh LiCl-KCl (3.81 cm dia.×0.21 cm), the hypergolic material was a mixture of 2.325 gm of $Li_{0.70}B_{0.30}$ and 0.390 gm $Na_2C_2$ with 0.100 gm of −10 mesh $Na_2C_2$ placed on top of this mixture, and the anode material was 4.9 gm of $Li_{0.78}B_{0.22}$ with an anode area of 5.1 cm$^2$. The discharge curves for this cell test are shown in FIG. 3. Zero time for all measurements in this example, as well as in those below, coincided with the time at which the chlorine gas valves were opened. An external load of 0.07Ω was imposed on the cell immediately after introduction of the chlorine gas.

About 30 seconds lapsed before current and voltage were observed for the cell of FIG. 1. The average voltage and current measured was 1.6 volts and 43 amperes, respectively. The current density was rather high at 8.2 amps/cm$^2$. The coulombic efficiency of the anode material was 56%.

EXAMPLE II

Figure 4:
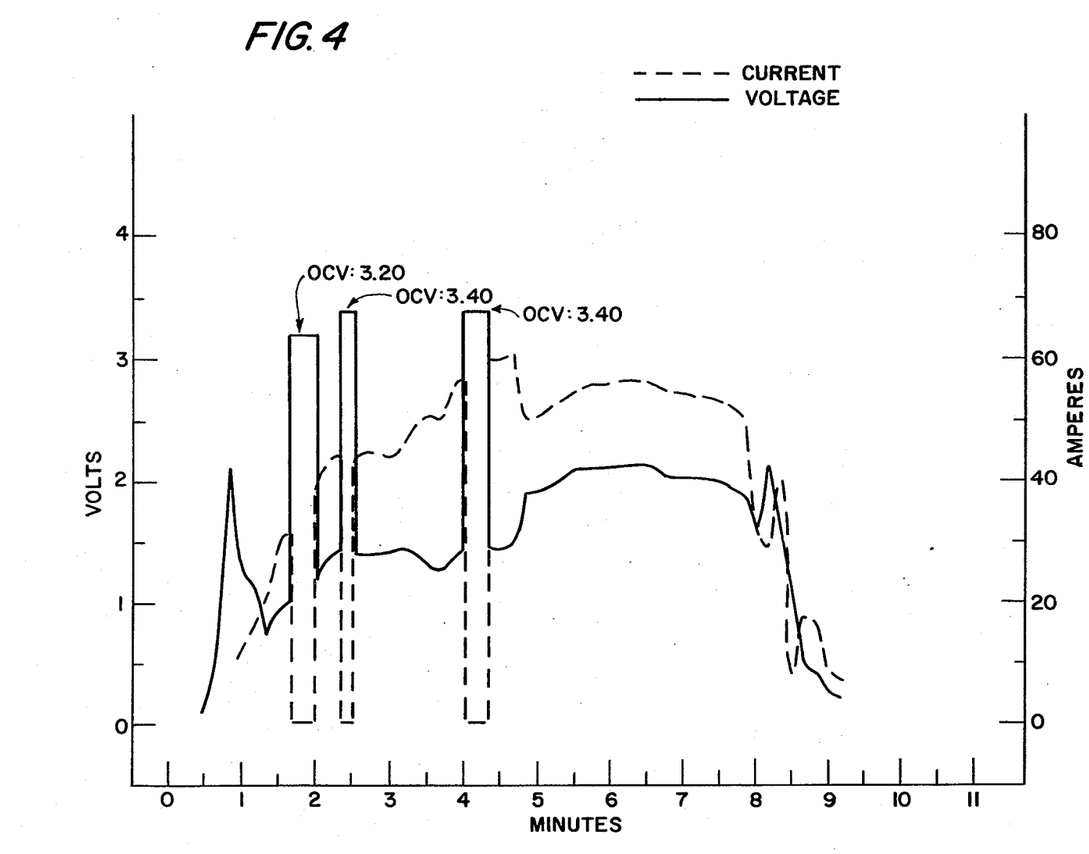
FIG. 4 shows another current and voltage discharge curve for the cell of FIG. 1.

The cell assembly of Example I was repeated with slight modifications. The amount of −10 mesh $Na_2C_2$ was 0.050 grams and the anode material was 5.4 grams of $Li_{0.78}B_{0.22}$ with an anode area of 5.8 cm$^2$. In this example the load on the external circuit was varied to ascertain whether the anode material could support a high current drain. Thus, at 50 seconds the external load on the cell was 0.07Ω. Between the 3 and 4 minute marks the load was decreased below 0.07Ω. At 4 minutes and forty-five seconds the load was increased to 0.07Ω. The discharge curves for this cell are shown in FIG. 4.

Open circuit voltage appeared after 26 seconds and current after 50 seconds. The average voltage and current measured was 1.6 volts and 43 amperes, respectively, as in Example I. A maximum current of 61 amps at 1.5 volts was measured. The current density of the cell was 7.5 amps/cm$^2$. The open circuit voltage (OCV) was 3.40 volts and the coulombic efficiency of the anode material was 41%.

EXAMPLE III

Figure 5:
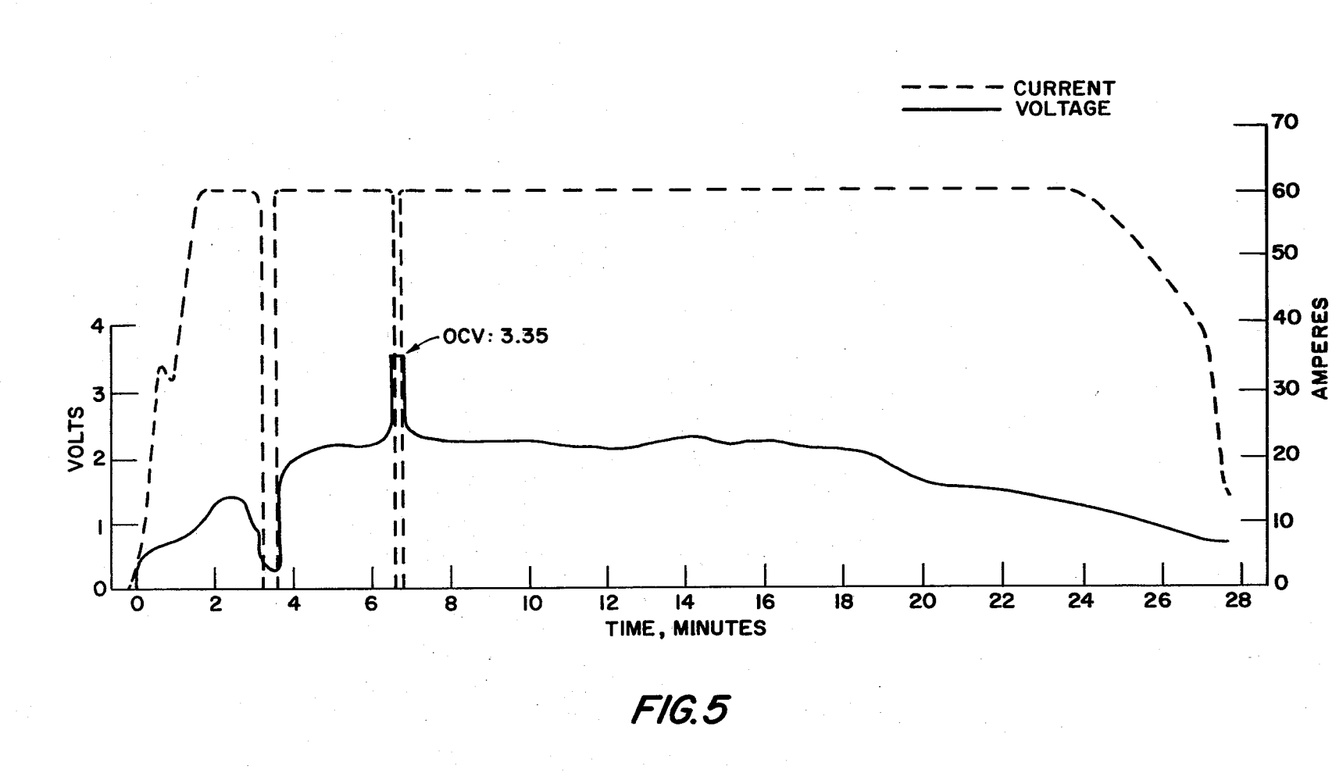
FIG. 5 shows a current and voltage discharge curve for the cell of FIG. 2.

An electrochemical cell such as the one shown in FIG. 2 was assembled wherein a 3.0 gm electrolyte pellet (3.81 cm dia×0.14 cm) of LiCl-KCl was placed on top of the porous cathode and 1.4 gm of −80 mesh loose powder LiCl-KCl spread uniformly around the LiCl-KCl pellet. The anode material containing 16.1 gm $Li_{0.78}B_{0.22}$ having an area of 11.4 cm$^2$ was placed on top of the LiCl-KCl pellet and centered. Then 0.342 gm of −10 mesh $Na_2C_2$ was uniformly placed on top of the loose powder and electrolyte pellet of LiCl-KCl and around the anode material. A uniform mixture of 1.101 gm of −80 mesh $Na_2C_2$ and 3.2 grams of −35 mesh $Li_{0.73}B_{0.27}$ was placed on top of the 0.342 gm $Na_2C_2$. Finally, an additional 0.342 gm of −10 mesh $Na_2C_2$ was placed on top of the $Na_2C_2$-$Li_{0.78}B_{0.47}$ mixture. The discharge curves for this cell test are shown in FIG. 5.

Thirty seconds elapsed after the introduction of chlorine gas before current and voltage were observed. The cell was discharged for twenty seven minutes at an average current and voltage of 56 amperes and 2.00 volts. At about three minutes a short circuit developed which lasted for about twenty seconds. The open circuit voltage of the cell (OCV) was 3.35 volts and fifty seven percent of the lithium in the $Li_{0.78}B_{0.22}$ was utilized electrochemically. The current density of the cell was 4.9 amps/cm$^2$.

Postmortem analysis of the anode materials used in the above examples indicated that the dimensions of the anodes had decreased by ten percent after discharge.

The high open circuit voltages and high current densities indicate that the anode material of the present invention has the electrochemical characteristics of nearly pure lithium metal.

While the anode material of the present invention has been described with particular emphasis on its use as a replacement for the lithium metal anode in the lithium-chlorine fused salt electrochemical system, the lithium-boron anode material can be used in diverse types of electrochemical cells. In short, the lithium-boron anode material can be used in virtually any cell in which reactive metals such as lithium, sodium, magnesium, beryllium, aluminum or calcium, or alloys of these metals are presently being used.

More specifically, the anode material of the present invention may be substituted for the magnesium anode in "dry" battery systems such as the system disclosed in U.S. Pat. No. 3,060,255 in which the electrolyte is a water soluble sulfamate of lithium, sodium, potassium, magnesium, or calcium, for example, provided, of course, that the parasitic reactions are minimized.

The lithium-boron anode material may also be used in cells utilizing inorganic electrolyte systems such as the system disclosed in U.S. Pat. No. 3,408,229 in which the electrolyte is a solution of sulfur and a thiocyanate salt in ammonia. Other suitable inorganic electrolyte systems in which the new anode maerials may be used are disclosed in U.S. Pat. No. 3,424,621 in which the electrolyte is a solution of an ionizable metallic salt, e.g., KF, in anhydrous HF, and in U.S. Pat. Nos. 3,532,546 and 3,891,458.

The anode material described herein also finds utility in electrochemical cells employing organic electrolyte systems. Thus, the lithium-boron anode material may be utilized in the electrochemical cell of U.S. Pat. No. 3,185,590 in which the electrolyte is lithium chloride in dimethylformamide and the cathode material is a polyquinone resin. The anode material of this invention may likewise be used in the cell of U.S. Pat. No. 3,489,611 in which organic nitrates serve as the cathode material and the electrolyte is composed of lithium salts dissolved in an aprotic solvent, or in the cell of U.S. Pat. No. 3,413,154 wherein sulfur is the cathode material in combination with an inert conductor, and the electrolyte is a solution of a complex metal halide salt in an organic solvent such as propylene carbonate, δ-butyrolacetone, N,N-dimethylformamide, or dimethylsulfoxide. Other types of cells which contain organic electrolytes and in which the present invention finds utility are disclosed by Dey et al in U.S. Pat. Nos. 3,679,484, 3,681,143 and 3,681,144.

The anode material of the present invention may also be used in electrochemical cells employing solid electrolyte systems such as those disclosed in U.S. Pat. Nos. 3,455,742, 3,476,602 and 3,824,130. And as already described above, the lithium-boron anode material may be used in molten electrolyte electrochemical cells. Additional examples of molten electrolyte cells in which the lithium-boron anode material finds utility are disclosed in U.S. Pat. Nos. 3,470,027 and 3,488,221. In addition, the anode material of the present invention may also be used in the Li-H$_2$O electrochemical system which has been developed by the Lockheed Corp.

Obviously, numerous modifications and variations of the present invention are possible in light of the above teachings. It is therefore to be understood that, within the scope of the appended claims, the invention may be practiced otherwise than as specifically described.

We claim:

1. A current generating electrochemical cell comprising an anode material, a cathode material, and an electrolyte selected from the group consisting of solid and fusible electrolytes positioned between and in contact with said anode material and said cathode material wherein said anode material consists essentially of from about 50 weight percent to about 90 weight percent of lithium and from about 10 weight percent to about 50 weight percent of boron.

2. The electrochemical cell of claim 1 wherein the anode material consists essentially of from about 60 weight percent to about 80 weight percent of lithium and from about 40 weight percent to about 20 weight percent of boron, and said cell is a primary cell.

3. The electrochemical cell of claim 2 wherein the cathode material is selected from the group consisting of a halogen, and a chalcogen having a molecular weight between 16 and 52, the electrolyte is a fusible alkali metal salt, or mixture thereof, a fusible alkali earth metal salt, or mixtures thereof, and mixtures of said alkali metal salts and alkali earth metal salts, and said cell is a heat activated cell.

4. The electrochemical cell of claim 3 wherein the anode material consists essentially of 70 weight percent of lithium and 30 weight percent boron, the cathode is chlorine gas, the electrolyte is a eutectic mixture of lithium chloride and potassium chloride and the cell is activated by a hypergolic composition.

5. In a heat-activated, primary, current producing electrochemical cell comprising an anode material consisting essentially of an alkali metal or an alkali earth metal, a fusible electrolyte comprising an alkali metal salt or mixtures thereof, an alkali earth metal salt or mixtures thereof, and mixtures of said alkali metal salt and said alkali earth metal salt, and a cathode material selected from the group consisting of an elemental halogen, and a chalcogen having a molecular weight between 16 and 52, the improvement wherein said anode comprises an alloy consisting essentially of from about 50 weight percent to about 90 weight percent of lithium, and from about 50 weight percent to about 10 weight percent of boron.

6. The electrochemical cell of claim 5 wherein the anode comprises an alloy consisting essentially of from about 60 weight percent to about 80 weight percent of lithium and from about 40 weight percent to about 20 weight percent of boron.

* * * * *